United States Patent
Miyamoto et al.

(10) Patent No.: US 7,812,084 B2
(45) Date of Patent: Oct. 12, 2010

(54) POLYAMIC ACID COMPOSITION, PRODUCTION METHOD THEREOF, POLYIMIDE RESIN, SEMICONDUCTIVE MEMBER AND IMAGE-FORMING APPARATUS

(75) Inventors: Hiroshi Miyamoto, Kanagawa (JP); Shoichi Morita, Kanagawa (JP); Seiichi Katoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 623 days.

(21) Appl. No.: 11/898,432

(22) Filed: Sep. 12, 2007

(65) Prior Publication Data

US 2008/0081880 A1    Apr. 3, 2008

(30) Foreign Application Priority Data

Oct. 3, 2006   (JP) ............................. 2006-271774
Jun. 22, 2007  (JP) ............................. 2007-164900

(51) Int. Cl.
*C08G 69/26*   (2006.01)
*C08L 79/08*   (2006.01)
*C08F 283/00*  (2006.01)

(52) U.S. Cl. ........................ 524/501; 524/500; 524/538

(58) Field of Classification Search .................. 524/500, 524/501, 538

See application file for complete search history.

(56) References Cited

U.S. PATENT DOCUMENTS 7,316,791 B2 *   1/2008   Meloni et al. ............... 252/500

FOREIGN PATENT DOCUMENTS

| JP | A-03-028229 | 2/1991 |
| JP | A-05-077252 | 3/1993 |
| JP | B2-2560727 | 9/1996 |
| JP | 08259709 A * | 10/1996 |
| JP | A-08-259709 | 10/1996 |
| JP | A-09-176329 | 7/1997 |
| JP | A-2003-226765 | 8/2003 |

* cited by examiner

*Primary Examiner*—Kelechi C Egwim
(74) *Attorney, Agent, or Firm*—Oliff & Berridge, PLC (57) ABSTRACT

A polyamic acid composition, containing polyamic acid and polyaniline particles, with reduced fluctuation of properties after production; a preparation method for the same; a polyimide resin having reduced fluctuation of resistance properties, superior mechanical properties and superior surface smoothness; a semiconductive member, and an image-forming apparatus having the semiconductive member as a belt. A polyamic acid composition, including a polyamic acid, polyaniline particles having a fibrous region with an aspect ratio of between approximately 1 to approximately 100 or less, a dopant, and a solvent.

4 Claims, 1 Drawing Sheet

FIG.1

POLYAMIC ACID COMPOSITION, PRODUCTION METHOD THEREOF, POLYIMIDE RESIN, SEMICONDUCTIVE MEMBER AND IMAGE-FORMING APPARATUS

CROSS-REFERENCE TO RELATED APPLICATION

This application claims priority under 35 USC 119 from Japanese Patent Application No. 2006-271774 and No. 2007-164900.

BACKGROUND

1. Technical Field

The invention relates to a polyamic acid composition, a production method thereof, a polyimide resin, a semiconductive member and an image-forming apparatus.

2. Related Art

Electrophotographic systems are apparatus for obtaining an image by first forming an electric charge on a photosensitive body, after forming a latent electrostatic image by irradiation with a laser beam based on a modulated image signal, then developing the latent electrostatic image with a charged toner into a toner image, and finally transferring the toner image, directly, or indirectly via an intermediate transfer body, onto a recording medium such as paper.

In apparatuses that use the above intermediate transfer method, which is a method wherein a toner image formed on the photosensitive body is primary-transferred onto an intermediate transfer body and then secondary-transferred onto a recording medium such as paper, a belt has been proposed as the intermediate transfer body having a thermoplastic resin such as polyvinylidene fluoride, polycarbonate, a blend of polycarbonate and an ethylene-tetrafluoroethylene copolymer, or the like, and with a conductive agent such as carbon black dispersed therein.

An intermediate transfer body having a polyimide resin and containing carbon black dispersed therein as conductive material has also been proposed.

Also known is a method of using a conductive polymer such as polyaniline as a conductive material for making a polyimide resin-molded article conductive (where "conductive" is defined as having a volumetric resistivity of ca. $10^8$ to $10^{13}$ $\Omega$cm, the same shall apply hereinafter). Conductive polymers such as polyaniline are easily soluble or dispersible in polyimide varnish, and thus, are advantageous in that it is possible to give a molded article a particular resistance, and to reduce fluctuations in resistance.

SUMMARY

According to an aspect of the invention, there is provided a polyamic acid composition, a production method thereof, a polyimide resin, a semiconductive member and an image-forming apparatus.

A first aspect of the invention provides a polyamic acid composition, comprising: a polyamic acid; polyaniline particle including a fibrous region having an aspect ratio of between approximately 1 to approximately 100; a dopant; and a solvent.

A second aspect of the invention provides a polyimide resin, comprising polyaniline particles including a fibrous region having an aspect ratio of between approximately 1 to approximately 100.

A third aspect of the invention provides a semiconductive member, comprising a polyimide resin including polyaniline particles including a fibrous region having an aspect ratio between approximately 1 to approximately 100.

A fourth aspect of the invention provides a method of producing a polyamic acid composition, the method comprising: a first dispersion liquid containing conductive polyaniline particles (A), that including a fibrous region having an aspect ratio of between approximately 1 to approximately 100 dispersed in a liquid containing polyamic acid; and a second dispersion liquid containing non-conductive polyaniline particles (B) and a dopant in a liquid containing polyamic acid; and mixing together the first and the second dispersions.

BRIEF DESCRIPTION OF THE DRAWINGS

Exemplary aspects of the invention will be described in detail based on the following figures, wherein.

DETAILED DESCRIPTION

Exemplary Aspects

Hereinafter, the invention will be described in detail.

<Polyamic Acid Composition>

The polyamic acid composition of the invention characteristically include a polyamic acid, polyaniline particles containing a fibrous region having an aspect ratio of more than 1 and 100 or less, a dopant, and a solvent.

In using polyaniline as a conductive material in polyimide resin, it is necessary to add an acidic compound as a dopant for making the polyaniline conductive in a large amount in the polyamic acid solution, raw material for the polyimide resin; however presence of the acidic compound may accelerate hydrolysis of the polyamic acid, leading to deterioration in the viscosity of the polyamic acid composition, and also accelerate imidation reaction, thickening, and consequently precipitating, the polyamic acid composition.

In the invention, it was found that polyaniline particles in a particular shape having a fibrous region are lower in resistance than particulate polyaniline particles, and that it was possible to reduce the content of the polyaniline particles and fluctuation in the properties of the polyamic acid composition, by dispersing the polyaniline particles in a particular shape in a polyamic acid solution. Although the reason is not clear, it was also found that presence of the polyaniline particles was effective in improving the surface smoothness of the polyimide molded article obtained and also in reducing the fluctuation in resistance. Hereinafter, composition of components for the polyamic acid composition of the invention will be described.

(Polyaniline Particle)

The polyaniline particle for use in the invention is a conductive material, and the synthesizing methods and the structure of polyaniline are described in detail in JP-A No. 3-28,229.

The polyaniline particle of the invention is prepared easily, for example, from aniline or an aniline derivative by oxidation polymerization. The polyaniline particle is known to have various structures according to its oxidative state: leucoemeraldine, emeraldine and pernigraniline.

Among them, polyaniline particle having an emeraldine structure is most conductive when charged (doped) and stable in air, and thus most useful. Polyaniline is vulnerable to oxidation, and the content of the pernigraniline structure is preferably smaller for improvement in conductivity and stabilization, and thus, it is preferably doped in its more reductive state.

Examples of the reducing agent favorably used to make polyaniline in the reductive state include hydrazine compounds such as phenylhydrazine, hydrazine, hydrazine hydrate, hydrazine sulfate, and hydrazine hydrochloride; reductive metal hydride compounds such as lithium aluminum hydride and lithium borohydride; and the like.

The polyaniline can be prepared, for example, by oxidatively polymerizing aniline with an oxidizing agent in solvent in the presence of a protonic acid at a temperature kept to 5° C. or lower, preferably 0° C. or lower, producing a conductive (doped) oxidized polyaniline by using a particular compound described below, and then, non-conductive (dedoping) the conductive (doped) polyaniline with a basic substance.

The shape of the polyaniline particle varies significantly according to the electrolyte used during electrolytic polymerization, and it is possible to obtain a green film on the electrode surface quite easily by electrolytic oxidation of aniline in an acidic aqueous solution, however a fine structure of fibrous (by polymerization with an aqueous perchloric acid or tetrafluoroboric acid solution), granular (by polymerization with an aqueous nitric acid or hydrochloric acid solution), or coral-shaped (by polymerization with an aqueous sulfuric acid solution) is formed, depending on the kind of the acid used.

The polyaniline particle of the invention contains a fibrous region having an aspect ratio (length/width) of more than approximately 1 and approximately 100 or less. Hereinafter, the polyaniline particle may be referred to as "polyaniline particle in a particular shape" in some cases.

The fibrous region includes not only the so-called filamentous region, but also the agglomerate thereof, simple long rod-shaped and projecting regions, and others. The polyaniline particle of the invention may contain only the fibrous region, or alternatively, the fibrous region in combination with a fibrous, granular, cubic, or other region bound thereto.

In such a case, the fibrous region means only a region in the polyaniline particle where continuous filamentous regions spread, and, for example, when the particle has a shape in which a particulate region is bound to the terminal of the fibrous region, the fibrous region is the region excluding the particulate region, and, when the particle has a shape in which a particulate region is bound to the center of the fibrous region, it is a region excluding the particulate region sticking out of the filamentous region.

When the fibrous region has an aspect ratio of 1, the particle becomes more spherical as a whole, prohibiting decrease in resistance. When the aspect ratio is more than approximately 100, the particle become too longer and narrower, leading to deterioration of dispersion efficiency of the composition and also of the surface smoothness of the polyimide mold product described below.

The aspect ratio is preferably in the range of approximately 3 to approximately 50, more preferably in the range of approximately 10 to approximately 30. The aspect ratio can by controlled by adjusting the pH of the aqueous solution.

The length of the fibrous region in the polyaniline particle in a particular shape is preferably in the range of approximately 0.1 to approximately 10 μm, for production of a low-resistance particle. The thickness of the fibrous region is preferably in the range of approximately 0.002 to approximately 3.3 μm, from the same viewpoint.

As described above, the polyaniline particles in a particular shape can be prepared by using an aqueous solution containing perchloric acid or tetrafluoroboric acid. An example of the polyaniline particle thus prepared is a particle in the shape having the head region having a maximum diameter of 50 μm or less and the tail region (fibrous region) having an aspect ratio of more than 1 and 100 or less; and, in such a case, for example, the head region is a region having a diameter of ¹/₁₀ (μm) or more of the maximum diameter as seen from the site having a maximal width of the crosssection of the linear tail region at ¹/₁₀ (μm) or less of the maximum diameter, while the tail region is a region containing the site having a width of ¹/₁₀ (μm) or less of the maximum diameter as seen from the site having a crosssectional width of ¹/₁₀ (μm) or less of the maximum diameter. The maximum diameter of the head region can be adjusted by controlling the polymerization period of polyaniline, and a longer polymerization period leads to extension of the maximum diameter. In addition, the aspect ratio of the tail region can be adjusted by controlling the pH of the aqueous solution.

The maximum length of the polyaniline particles in a particular shape of the invention is preferably in the range of approximately 0.5 to approximately 50 μm, more preferably in the range of approximately 0.5 to approximately 10 μm. A maximum length of less than approximately 0.5 μm may cause aggregation of the particles in the composition, possibly leading to fluctuation of the liquid properties. A maximum length of more than approximately 50 μm may lead to deterioration in dispersion stability and also in the surface smoothness of the molded resin articles.

The shape and the particle diameter of the polyaniline particles in a particular shape in the polyamic acid composition can be examined by converting the polyamic acid composition into a polyimide resin by curing and observing the resin particles dispersed in the polyimide resin. The test method will be described below.

In addition to the polyaniline particles containing a fibrous region having an aspect ratio of more than approximately 1 and approximately 100 or less, the polyamic acid composition of the invention may contain additionally polyaniline particles in a granular, coral-shaped, or other shape, as will be described below. In such a case, the maximum diameter of the polyaniline particles for use is preferably in the range of approximately 0.5 to approximately 10 μm. The content of the polyaniline particles, for example in the granular shape, in the polyamic acid composition will be described below.

The content of the polyaniline particles in a particular shape in the polyamic acid composition of the invention is preferably in the range of approximately 1% to approximately 15% by weight thereof, more preferably in the range of approximately 3% to approximately 10% by weight thereof.

A content of less than approximately 1% by weight thereof may lead to insufficient content of the polyaniline particle as a conductive material, prohibiting production of a molded resin article having desirable resistance. A content of more than approximately 15% by weight thereof may lead to excessively lower resistance of the molded resin article and also to deterioration in surface smoothness.

(Polyamic Acid)

The polyamic acid of the invention is a compound obtained by polymerization reaction of a tetracarboxylic dianhydride and a diamine compound respectively in the equimolecular amounts in a polar organic solvent. Hereinafter, the tetracarboxylic dianhydride and the diamine compound will be described.

—Tetracarboxylic Dianhydride—

The tetracarboxylic dianhydride for use in preparation of the polyamic acid is not particularly limited and may be any aromatic or aliphatic compound.

Examples of the aromatic tetracarboxylic acids include pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylethertetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenediphthalic dianhydride, 3,3',4,4'-biphenyl tetracarboxylic dianhydride, bis(phthalic acid)phenylphosphine oxide dianhydride, p-phenylene-bis(triphenylphthalic acid) dianhydride, m-phenylene-bis(triphenylphthalic acid) dianhydride, bis(triphenylphthalic acid)-4,4'-diphenylether dianhydride, bis(triphenylphthalic acid)-4,4'-diphenylmethane dianhydride, and the like.

Examples of the aliphatic tetracarboxylic dianhydrides include aliphatic or alicyclic tetracarboxylic dianhydrides such as butanetetracarboxylic dianhydride, 1,2,3,4-cyclobutanetetracarboxylic dianhydride, 1,3-dimethyl-1,2,3,4-cyclobutanetetracarboxylic acid, 1,2,3,4-cyclopentanetetracarboxylic dianhydride, 2,3,5-tricarboxycyclopentylacetic dianhydride, 3,5,6-tricarboxynorbomane-2-acetic dianhydride, 2,3,4,5-tetrahydrofurantetracarboxylic dianhydride, 5-(2,5-dioxotetrahydro furanyl)-3-methyl-3-cyclohexene-1,2-dicarboxylic dianhydride, and bicyclo[2,2,2]-oct-7-ene-2,3,5,6-tetracarboxylic dianhydride; aromatic ring-containing aliphatic tetracarboxylic dianhydrides such as 1,3,3a,4,5,9b-hexahydro-2,5-dioxo-3-furanyl-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione; and the like.

The tetracarboxylic dianhydride for use in the invention is desirably an aromatic tetracarboxylic dianhydride, more preferably pyromellitic dianhydride, 3,3',4,4'-benzophenonetetracarboxylic dianhydride, or 3,3',4,4'-biphenylsulfonetetracarboxylic dianhydride. These tetracarboxylic dianhydrides may be used alone or in combination of two or more.

—Diamine Compounds—

The diamine compound for use in preparation of the polyamic acid is not particularly limited, if it is a diamine compound having two amino groups in its molecular structure.

Specific examples thereof include aromatic diamines such as p-phenylenediamine, m-phenylenediamine, 4,4'-diaminodiphenylmethane, 4,4'-diaminodiphenylethane, 4,4'-diaminodiphenylether, 4,4'-diaminodiphenylsulfide, 4,4'-diaminodiphenylsulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenylether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl]propane, 2,2-bis[4-(4-aminophenoxy)phenyl]hexafluoropropane, 1,4-bis(4-aminophenoxy)benzene, 4,4'-bis(4-aminophenoxy)-biphenyl, 1,3'-bis(4-aminophenoxy)benzene, 9,9-bis(4-aminophenyl)fluorene, 4,4'-(p-phenylene isopropylidene)bisaniline, 4,4'-(m-phenylene isopropylidene)bisaniline, 2,2'-bis[4-(4-amino-2-trifluoromethylphenoxy)phenyl]hexafluoropropane, and 4,4'-bis[4-(4-amino-2-trifluoromethyl)phenoxy]-octafluorobiphenyl; aromatic diamines having two amino groups bound to an aromatic ring and a heteroatom other than the nitrogen atoms of the amino groups such as diaminotetraphenylthiophene; aliphatic diamine and alicyclic diamines such as 1,1-meta xylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylenedimethylenediamine, tricyclo[6,2,1.02.7]-undecylenedimethyldiamine, and 4,4'-methylenebis(cyclohexylamine); and the like.

The diamine compound for use in the invention is desirably p-phenylenediamine, 4,4'-diaminodiphenylmethane, 4,4'-diaminodiphenylether, 4,4'-diaminodiphenyl sulfide, or 4,4'-diaminodiphenylsulfone. These diamine compounds may be used alone or in combination of two or more.

The polyamic acid of the invention is preferably a compound prepared from an aromatic tetracarboxylic dianhydride and an aromatic diamine, from the viewpoint of the strength of the molded article. In addition, a compound from a biphenyltetracarboxylic dianhydride and oxydianiline is also favorable.

Examples of the polar organic solvents used in preparation reaction of the polyamic acid include sulfoxide solvents such as dimethylsulfoxide and diethylsulfoxide, formamide solvents such as N,N-dimethylformamide and N,N-diethylformamide, acetamide solvents such as N,N-dimethylacetamide and N,N-diethylacetamide, pyrrolidone solvents such as N-methyl-2-pyrrolidone and N-vinyl-2-pyrrolidone, phenol-based solvents such as phenol, o-, m-, or p-cresol, xylenol, halogenated phenols and catechol, ether solvents such as tetrahydrofuran, dioxane and dioxolane, alcohol solvents such as methanol, ethanol and butanol, cellosolve solvents such as butyl cellosolve, hexamethylphosphoramide, γ-butylolactone, and the like; these solvent may be desirably used alone or in combination of two or more; and further, and aromatic hydrocarbons such as xylene and toluene may also be used.

The concentration of the solid matter in the reaction solution during polymerization of polyamic acid is not particularly limited, however preferably in the range of approximately 5% to approximately 50% by weight thereof, more preferably in the range of approximately 10% to approximately 30% by weight thereof. A solid matter concentration of less than approximately 5% by weight thereof may lead to decrease in the polymerization degree of the polyamic acid and consequently to deterioration in the strength of the molded article obtained. Alternatively, a solid matter concentration during polymerization of higher than approximately 50% by weight thereof may lead to insolubilization of part of the raw material monomer, prohibiting the reaction.

The reaction temperature during polymerization of polyamic acid is in the range of 0° C. to 80° C. It is because a reaction temperature of 0° C. or lower may lead to increase in the solution viscosity, prohibiting efficient agitation of the reaction system. Alternatively, a reaction temperature of higher than 80° C. cause a problem in controlling the reaction, because it causes partial imidation reaction together with polymerization of the polyamic acid.

(Dopant)

The polyaniline can be made conductive by using a particular compound. The "dopant" in the invention means a compound that makes the polyaniline conductive. An acidic compound such as protonic acid is used favorably as the dopant. The protonic acid is preferably a compound that does not vaporize or decompose by heat treatment during polyimide molding; and, for example, a sulfonic acid compound or an organic carboxylic acid compound is used favorably.

Examples of the sulfonic acid compounds include aminonaphtholsulfonic acid, metanilic acid, sulfanilic acid, allylsulfonic acid, phenolsulfonic acid, xylenesulfonic acid, chlorobenzenesulfonic acid, methanesulfonic acid, ethanesulfonic acid, 1-propanesulfonic acid, 1-butanesulfonic acid, 1-hexanesulfonic acid, 1-heptanesulfonic acid, 1-octanesulfonic acid, 1-nonanesulfonic acid, 1-decanesulfonic acid, 1-dodecanesulfonic acid, benzenesulfonic acid, styrenesulfonic acid, p-toluenesulfonic acid, naphthalenesulfonic acid, ethylbenzenesulfonic acid, propylbenzenesulfonic acid, butylbenzenesulfonic acid, pentylbenzenesulfonic acid, hexylbenzenesulfonic acid, heptylbenzenesulfonic acid, octylbenzenesulfonic acid, nonylbenzenesulfonic acid, decylbenzenesulfonic acid, undecylbenzenesulfonic acid, dodecylbenzenesulfonic acid, pentadecylbenzenesulfonic acid, octadecylbenzenesulfonic acid, diethylbenzenesulfonic acid, dipropylbenzenesulfonic acid, dibutylbenzenesulfonic acid, methylnaphthalenesulfonic acid, ethylnaphthalenesulfonic acid, propylnaphthalenesulfonic acid, butylnaphthalenesulfonic acid, pentylnaphthalenesulfonic acid, hexylnaphthalenesulfonic acid, heptylnaphthalenesulfonic acid, octylnaphthalenesulfonic acid, nonylnaphthalenesulfonic acid, decylnaphthalenesulfonic acid, undecylnaphthalenesulfonic acid, dodecylnaphthalenesulfonic acid, pentadecylnaphthalenesulfonic acid, octadecylnaphthalenesulfonic acid, dimethylnaphthalenesulfonic acid, diethylnaphthalenesulfonic acid, dipropylnaphthalenesulfonic acid, dibutylnaphthalenesulfonic acid, dipentylnaphthalenesulfonic acid, dihexylnaphthalenesulfonic acid, diheptylnaphthalenesulfonic acid, dioctylnaphthalenesulfonic acid, dinonylnaphthalenesulfonic acid, trimethylnaphthalenesulfonic acid, triethylnaphthalenesulfonic acid, tripropylnaphthalenesulfonic acid, tributylnaphthalenesulfonic acid, camphorsulfonic acid, acrylamido-t-butylsulfonic acid, and the like. Among them, phenolsulfonic acid is used favorably.

Specific examples of the organic carboxylic acid compounds include benzoic acid, m-bromobenzoic acid, p-chlorobenzoic acid, m-chlorobenzoic acid, p-chlorobenzoic acid, o-nitrobenzoic acid, 2,4-dinitrobenzoic acid, 3,5-dinitrobenzoic acid, picric acid, o-chlorobenzoic acid, p-nitrobenzoic acid, m-nitrobenzoic acid, trimethylbenzoic acid, p-cyanobenzoic acid, m-cyanobenzoic acid, thymol blue, salicylic acid, 5-aminosalicyclic acid, o-methoxybenzoic acid, p-oxybenzoic acid, and the like.

Further in the invention, the protonic acid used as a dopant may be a polymer acid. Examples of the polymer acids include polyvinylsulfuric acid, polyvinylsulfuric acid, polystyrenesulfonic acid, sulfonated styrene-butadiene copolymers, polyallylsulfonic acid, polymethallylsulfonic acid, poly-2-acrylamido-2-methylpropanesulfonic acid, polyisoprenesulfonic acid, and the like.

Particularly favorable among these dopants are dodecylbenzenesulfonic acid, phenolsulfonic acid, and benzenesulfonic acid.

The dopant is preferably added in an amount in the range of approximately 0.1 to approximately 5 equivalences with respect to the constituent units for the polyaniline, more preferably in the range of approximately 1 to approximately 3 equivalences.

(Solvent)

The solvent in the invention solvent is not particularly limited, if it dissolves the polyamic acid, and specific examples thereof include sulfoxide solvents such as dimethylsulfoxide and diethylsulfoxide; formamide solvents such as N,N-dimethylformamide and N,N-diethylformamide; acetamide solvents such as N,N-dimethylacetamide and N,N-diethylacetamide; pyrrolidone solvents such as N-methyl-2-pyrrolidone and N-vinyl-2-pyrrolidone; phenol solvents such as phenol, o-, m- or p-cresol, xylenol, halogenated phenol, and catechol; ether solvents such as tetrahydrofuran, dioxane, and dioxolane; alcohol solvents such as methanol, ethanol, and butanol; cellosolve solvents such as butyl cellosolve; hexamethylphosphoramide, γ-butyrolactone, and the like; these solvents are desirably used alone or in combination; or alternatively, aromatic hydrocarbons such as xylene and toluene are also usable.

The solvent above may be used also in preparation of the polyamic acid solution described below. In addition, the solvent may be used continuously from the polymerization of polyamic acid described above, or may be replaced with a particular solvent after polymerization of polyamic acid. The solvent may be replaced, for example, by a method of adding a particular amount of solvent to the polymer solution after polymerization of polyamic acid, a method of re-dissolving the polyimide polymer after reprecipitation in a particular solvent, or a method of adjusting the solution composition by adding a particular solvent while the solvent is gradually removed. The concentration of the polyamic acid in the polyamic acid solution prepared is preferably in the range of approximately 10% to approximately 50% by weight thereof.

The solvent above may be used in preparation of the dispersion of polyaniline particles. In such a case, the content of polyaniline in the polyaniline particle dispersion prepared is preferably in the range of approximately 0.1% to approximately 30% by weight thereof.

In the invention, the polyaniline particles are described here as "dispersed" when mixed with a solvent, however a solution of the polyaniline particles, often prepared when the particle diameter is smaller, is also included in the "dispersion".

(Other Additives)

Other components (additives) that may be added to the polyamic acid composition of the invention include carbon black and the like. The carbon black is used, for example, for adjustment of the resistance of the polyimide resin obtained by using the polyamic acid composition of the invention.

For example, in preparing a polyimide-resin endless belt for an image-forming apparatus in the electrophotographic process by using the polyamic acid composition of the invention, the addition amount of the carbon black is preferably in the range of 0 to 20 parts by weight, more preferably in the range of 5 to 10 parts by weight, with respect to 100 parts by weight of the polyamic acid in the polyamic acid composition. If an addition amount of the carbon black is more than 20 parts by weight, desirable resistance may be prohibited. Further, by adding surface-treated carbon black in an amount of 5 to 10 parts by weight to the carbon black, it is possible to maximize the effect and improve the in-plane regularity and electric-field dependence of surface resistivity distinctively.

The production method for the polyamic acid composition of the invention is not particularly limited, if all of the components above are included; for example, the composition is prepared by mixing and dispersing the components in a dispersing machine; however for improvement in dispersion of the polyaniline particles and liquid properties of the composition, the following production method for the polyamic acid composition of the invention is preferably used.

<Method of Producing Polyamic Acid Composition>

The method of producing a polyamic acid composition of the invention is characterized by including a first dispersion-preparing step of preparing a first dispersion by dispersing conductive polyaniline particles (A) containing a fibrous region having an aspect ratio of larger than approximately 1 and approximately 100 or less in a solution containing polyamic acid, a second dispersion-preparing step of preparing a second dispersion by dispersing non-conductive polyaniline particles (B) and a dopant in a solution containing polyamic acid, and a mixing step of mixing the first and second dispersions.

In producing the polyamic acid composition, the non-conductive (undoped) polyaniline particles in a particular shape may be made conductive in the polyamic acid solution with a dopant added, but, in such a case, the dopant may attach and decompose the polyamic acid. Thus, the polyaniline particles in a particular shape are preferably added to the polyamic acid solution, as previously converted into the conductive state.

It was found in the invention that it was possible to prepare a polyamic acid composition superior in particle dispersion and liquid stability by preparing a first dispersion containing previously made conductive polyaniline particles in a particular shape (A) dispersed in a solution containing polyamic acid and separately a second dispersion containing non-conductive polyaniline particles (B) and a dopant dispersed in the solution containing polyamic acid (in first and second dispersion-preparing steps), and mixing the first and second dispersions (in mixing step).

The polyaniline particles (A) used in the first dispersion are conductive (doped) species of the polyaniline particles in a particular shape. The particles are doped by the method described above by using the dopant above.

In preparing the first dispersion, a polyaniline particle (A) dispersion containing dispersed polyaniline particles (A) and a polyamic acid solution containing polyamic acid may be produced separately and mixed and stirred, or alternatively, polyaniline particles (A) may be added to the polyamic acid solution directly and the mixture be stirred.

Preferably, the content of the polyaniline particles (A) in the first dispersion is in the range of 1% to 15% by weight thereof, while the content of the polyamic acid is in the range of approximately 5% to approximately 30% by weight thereof.

The polyaniline particles (B) for use in the second dispersion are preferably made non-conductive, and the particle diameter and the particle shape thereof are not particularly limited, and thus, the polyaniline particles (B) may be, for example, non-conductive polyaniline particles in a particular shape. However, as described above the polyaniline particles (B) for use in the second dispersion are preferably smaller in diameter (maximum diameter) than the polyaniline particles (A) and do not have the fibrous region, for giving a final polyamic acid composition in which the polyaniline particle are dispersed favorably. Specifically, particulate polyaniline particles having a maximum diameter of approximately 0.001 to approximately 0.1 μm are used favorably as the polyaniline particles (B).

The following two methods (a) and (b) are used favorably in preparing the second dispersion.

(a) A polyaniline particle (B) solution of polyaniline particles (B) and a polyamic acid solution containing polyamic acid are prepared separately. Then, the polyaniline particles are made conductive by addition of a dopant to the polyaniline particle (B) solution prepared; the polyamic acid solution is added gradually to the dispersion; and the mixture is then agitated and mixed to give a second dispersion.

(b) A polyaniline particle (B) solution containing polyaniline particles (B) and a polyamic acid solution containing polyamic acid are prepared separately. Then, a dopant is added to the polyamic acid solution prepared; the polyaniline particle (B) solution is added gradually thereto; and the mixture is agitated and mixed to give a second dispersion.

Preferably, the content of the polyaniline particles (B) in the second dispersion is in the range of 1% to 15% by weight thereof, while the content of the polyamic acid is in the range of approximately 5% to approximately 30% by weight thereof.

It is possible to prepare a polyamic acid composition of the invention, by mixing the first and second dispersions thus obtained.

In the mixing step, it is possible to obtain a polyamic acid composition lower in decrease in viscosity and superior in resistance without decomposition of the polyamic acid, by adjusting the ratio of the first to second dispersion and the content ratio of the polyaniline particle (A) to the polyaniline particle (B) in the polyamic acid composition in such a manner that the following conditions (i) and (ii) are satisfied:

(i) The ratio of the mixed mass of first dispersion P to the mixed mass of second dispersion Q, P/Q, is in the range of 3/7 to 7/3; and (ii) The mass of polyaniline particles (A) R, the mass of polyaniline particles (B) S, and the mass of polyamic acid T satisfy the following Formula (1):

$$(R+S)/(R+S+T) \leq 0.3 \quad \text{Formula (1)}$$

A ratio of the mixed mass of first dispersion P, P/Q in (i), at less than approximately 3/7 may lead to decomposition of the polyamic acid, resulting in decrease in viscosity, while a ratio P of more than approximately 7/3 to easier aggregation of the polyaniline particles and consequently to problems by adhesion of foreign matter on the molded article.

The ratio P/Q is more preferably in the range of approximately 4/6 to approximately 6/4.

As for the condition (ii), a ratio $(R+S)/(R+S+T)$ of more than approximately 0.3 leads to deterioration in elasticity of the polyimide-resin molded article prepared by using a polyamic acid composition described below, and, for example, such a polyamic acid composition give an endless belt, if prepared, that does not function as a belt.

The ratio $(R+S)/(R+S+T)$ is more preferably approximately 0.2 or less.

The ratio of the viscosity of the polyamic acid composition thus obtained immediately after preparation V0 to the viscosity thereof immediate after storage under room temperature environment (20 to 25° C., hereinafter, the same shall apply) for two days V2, V2/V0, is preferably 0.8 or more and 1.2 or less, more preferably 0.9 or more and 1.15 or less. A ratio V2/V0 of less than 0.8 may lead to decrease in viscosity and thus leakage of the composition during processing, consequently causing defects in the molded resin article, while a ratio of more than 1.2 to gelation of polyaniline, causing fluctuation of resistance and defects in image quality. The viscosity of the polyamic acid composition is a viscosity at a liquid temperature of 25° C., as determined by using a constant-speed viscometer PK100 manufactured by Hakke Co., Ltd.

The polyamic acid composition of the invention has been described above, however the invention is not restricted by these aspects, and various improvement, modification, and correction are possible by those who are skilled in the art within the scope of the invention.

<Polyimide Resin>

Hereinafter, the polyimide resin obtained the polyamic acid composition of the invention described above will be described. The polyimide resin of the invention is prepared by molding and curing the polyamic acid composition of the invention, and thus, contains the polyaniline particles in a particular shape.

The methods of determining the shape and the particle diameter of the polyaniline particles in the polyamic acid composition and also of the polyaniline particles in the polyimide resin will be described. The shape of the polyaniline particle of the invention having a fibrous region having aspect ratio (length/width) of more than approximately 1 and approximately 100 or less can be determined by subjecting a section prepared by cutting a molded resin article in the film shape formed by removing the solvent in the polyamic acid composition in the crosssectional direction or a section of the polyimide resin cut in the crosssectional direction to electron-beam coloring, incorporating the image of the polyaniline particles under a transmission electron microscope (hereinafter, referred to as "TEM"), processing the image, and measuring the length of the polyaniline peripheral edge (line at the boundary between the contrasted and non-contrasted regions formed by coloring).

The method of measuring the length, width, and maximum length of the fibrous region of the polyaniline particles in a particular shape of the invention will be described in detail below.

First, a sample in a stripe shape of approximately 1 mm×8 mm in size is cut off from the molded resin article (film or belt-shaped) above, (wherein the short side corresponds to the side to be observed or the molding direction during molding). A metal is deposited on one face of the sample for differentiation of the top and bottom surfaces of sample, and the sample is then embedded in an epoxy resin. After curing, a thin section having a thickness of approximately 0.1 µm is prepared by using a microtome with a diamond knife. The microtome used is, for example, UltraCut N manufactured by Reichert. If there is no polyaniline observed in the section obtained, the polyaniline is visualized by electron beam staining. The stain is selected, for example, from osmium tetroxide, ruthenium tetroxide, phosphotungstic acid, and iodine, properly considering the staining condition and the like.

Six images (three in the thickness direction×two in width direction) per section are obtained under a transmission electron microscope (TEM: Tecnai G2 manufactured by FEI) under the condition of an accelerating voltage of 100 KV and a magnification of 12,000 times.

Then, the particles in each of the TEM images at a magnification of 12,000 thus obtained are analyzed by using an image analyzer Image Pro Plus manufactured by U.S. Media Cybernetics. The TEM image is adjusted to the brightness and contrast suitable for measurement, and the shading thereof is corrected if there is some color gradient in the image. If there are a filler and others in addition to the polyaniline particles in a particular shape contained in the sample, they are removed previously by processing the image while the density of the particles is modified. The length (in the longitudinal direction) and the width (maximal width) of the polyaniline peripheral edge in the fibrous region described above are determined. The maximum length of particle is the length of the particle when the particle has only the fibrous region and the longest region of the entire particle when the particle has a fibrous region and a different-shaped region additionally.

The measurement of image is repeated in six visual fields, and the averages thereof are designated respectively as the length, width, and maximum length of the fibrous region of the polyaniline particles in a particular shape in the sample (wherein, polyaniline particle overlapping or in contact with each other in the image are eliminated from measurement). The sections for measurement were prepared from rectangular samples cut off from a molded resin article at a total of nine points, 3 points in the width direction and 3 points in the length direction. The measurement was repeated for the samples from the nine points, and the averages are designated respectively as the length, width, and maximum length of the fibrous region of the polyaniline particles in a particular shape in the polyimide resin.

The polyimide resin of the invention can be prepared by molding the polyamic acid composition of the invention for example in a mold and then heating the composition. The composition is heated at a heating temperature normally, first in the range of approximately 50 to approximately 200° C. and then in the range of approximately 150 to approximately 300° C. for imidation reaction. Insufficient imidation may lead to deterioration in mechanical properties and electrical characteristics.

The shape of the polyimide resin of the invention is not particularly limited, and may be in the shape of film, roll or belt. The film is used favorably, for example, as an antistatic sheet or an electromagnetic wave-shielding film. Alternatively, the roll can be used favorably, for example, as a conductive roll or a heat-resistant roll.

As for the electrical characteristics of the polyimide resin of the invention, the difference between a common logarithm of the surface resistance RL under an environment of 10° C. and 15% RH and a common logarithm of the surface resistance RH under an environment of 28° C. and 85% RH, (log RL−log RH), is preferably in the range of approximately 0.01 to approximately 1.0 (log Ω/square).

When the difference between common logarithms of RL and RH is in the range above, it is possible to avoid the problems caused by environmental change when the polyimide resin is used, for example as a mechanical part, effectively.

The difference between common logarithms of RL and RH is more preferably in the range of approximately 0.01 to approximately 0.7 (log Ω/square) and particularly preferably in the range of approximately 0.01 to approximately 0.5 (log Ω/square).

<Semiconductive Member>

Hereinafter, the semiconductive member obtained by using the polyimide resin of the invention described above will be described. The semiconductive member of the invention contains the polyimide resin of the invention in part or all thereof. Accordingly, the semiconductive member contains the polyaniline particles in a particular shape.

The methods of determining the shape and the particle diameter of the polyaniline particles in the polyimide resin are the same as those described above, and description thereof is omitted. When the semiconductive member is made only of the polyimide resin described above, the properties of the semiconductive member are the same as those of the polyimide resin described above, and also of the belt-shaped semiconductive member described below.

Hereinafter, the semiconductive member of the invention will be described by taking a semiconductive member in the belt shape (hereinafter, referred to as "polyimide resin belt"), which is particularly favorable in making the most of the favorable properties above, as an example.

Such a polyimide resin belt is favorably used in electrophotographic devices such as electrophotographic copying machine, laser beam printer, facsimile, and multi-functional composite machine. More specifically, the polyimide resin belt is used favorably as a transfer belt, a conveyor belt, an intermediate transfer belt in electrophotographic devices by the intermediate transfer method, or the like.

Increase in the difference between the maximum and minimum thicknesses of the semiconductive polyimide resin belt of the invention results in cockling. The belt cockling leads to deterioration in image quality during transfer or fixing in electrophotographic system, and thus should be avoided as much as possible. From the point above, the difference between the maximum and minimum thicknesses of the polyimide resin belt is preferably 20% or less of the average thickness of the polyimide resin belt. The "thickness of belt" is a thickness as determined by a thickness meter measuring the distance between a belt and a flat plate having an area of 5 mm$^2$ or more in contact therewith, and the height of the projections present on the belt surface having a width of 25 μm or less specifically is neglected.

An excessively larger thickness of the polyimide resin belt is undesirable from the viewpoints of thermal conductivity, resistance, and others, while an excessively smaller thickness is also undesirable, because of low toughness. Thus considering the applications of the belt, the belt thickness is preferably 10 μm or more and 1,000 μm or less, more preferably 30 μm or more and 150 μm or less.

The electrical characteristics, in particular the volumetric resistivity, of the polyimide resin belt may be adjusted according to applications. For example when the polyimide resin belt is used as an intermediate transfer belt, a common logarithm of the surface resistivity when an electric charge at 100 V is applied under an environment of 22° C. and 55% RH is preferably 9 to 14 (log Ω/square), more favorably 10 to 13 (log Ω/square), and still more favorably 11 to 13 (log Ω/square).

A common logarithm of surface resistivity at less than 9 (log Ω/square) leads to deterioration in the electrostatic force holding the electric charge on the unfixed toner image transferred from the image carrier onto the intermediate transfer belt, and thus to scattering of the toner to the area surrounding the image (blurring) and formation of an image with a greater noise by the electrostatic repulsive force among toner particles and the force by the fringe electric field at the image edge. On the other hand, a common logarithm of surface resistivity of larger than 14 (log Ω/square) leads to preservation of more electric charge and thus to electrification of the intermediate transfer body surface by the transfer electric field during primary transfer, which occasionally demands an additional antistatic mechanism. Thus, it is possible to eliminate the problems such as of scattering of toner and demand for an antistatic mechanism, by adjusting the surface resistivity in the range above.

The in-plane variation of the surface resistivity is preferably approximately 1.2 (log Ω/square) or less as common logarithmic value, more preferably approximately 0.8 (log Ω/square) or less. At an in-plane variation of approximately 1.2 (log Ω/square) or less, it is possible to apply a transfer voltage uniformly when the belt is used as an intermediate transfer belt and thus to obtain a superior high-quality transferred image. It also reduces the problem of local deterioration in surface resistivity. The in-plane variation of surface resistivity is the difference between common logarithms of the maximum and minimum values of surface resistivity on the surface of the polyimide resin belt.

As described above for the semiconductive member, it is possible to prevent generation of the various problems of belt effectively by adjusting the difference in the common logarithms of the surface resistivities when the condition for the temperature humidity environment is altered in a range similar to the favorable range above.

In addition, the polyimide resin belt preferably has a surface roughness Ra, as defined by JIS B0601 (2001), of the belt surface in the range of 0.1 μm or more and 0.5 μm or less. A belt-surface surface roughness Ra of more than 0.5 μm leads to convergence of electric field, possibly causing deterioration in resistance. The surface roughness Ra is more preferably 0.1 μm or less, particularly preferably 0.05 μm or less, for further preservation of its resistance. Although the surface roughness is not particularly limited, an excessively smaller surface roughness of the plane of the belt in contact with the mold (i.e., mold surface roughness) may lead to increase in the adhesiveness between belt and mold, making the belt released less easily, and thus, the lower limit of the surface roughness is generally 0.01 μm or more.

The surface roughness Ra was determined by using a surface roughness profilometer (Surfcom 1400A series product, manufactured by Tokyo Seimitsu Co., Ltd.) according to JIS B0601 (2001). Specifically, the belt surface at 24 positions (3 positions in the width direction by 8 positions in the peripheral direction) on a belt was studied under the condition of a test length of 2.5 mm, a cut-off wavelength of 0.8 mm, and a measurement speed of 0.60 mm/s, and the average was designated as the surface roughness Ra of the belt.

The polyimide resin belt is preferably prepared in a step of coating the polyamic acid composition of the invention on a cylindrical base material and a heat-treating step of heating the polyamic acid composition applied on the cylindrical base material. The polyimide resin belt thus obtained is mainly made of the polyimide resin.

Hereinafter, an example of the method of producing the polyimide resin belt will be described specifically. First, a polyamic acid composition of the invention described above is applied on the internal or external surface of a cylindrical base material mold. A cylindrical mold made of any one of various conventionally known raw materials such as resin, glass, and ceramic may be used, instead of the cylindrical metal mold. Alternatively, a glass or ceramic layer may be formed on the surface of the metal or other mold, and a silicone- or fluorine-based mold-releasing agent may be used as needed.

It is also advantageous to use a method of controlling the thickness of the solution applied on the cylindrical metal mold, by using a film thickness-controlling mold having a properly adjusted clearance to the cylindrical metal mold and removing excess solution while the thickness-controlling mold is moved in parallel with the cylindrical metal mold. If the thickness of the coating solution is properly adjusted in the step of applying the coating solution onto the cylindrical metal mold, there is no need for installing such a film thickness-controlling mold.

Then, the cylindrical metal mold carrying the polyamic acid composition is dried in a heated or vacuum environment until 30% by weight thereof or more, preferably 50% by weight or more thereof, of the solvent contained in the coating solution is evaporated (drying treatment). The drying temperature then is preferably in the range of 50 to 200° C.

The cylindrical metal mold is then heated at 150° C. to 300° C., allowing progress of imidation reaction. The imidation-reaction temperature may vary according to the kinds of the raw polyamic acid materials used, tetracarboxylic dianhydride and diamine, however is preferably a temperature at which the imide conversion is completed, for improvement in mechanical properties and electrical characteristics. Then, the polyimide resin is separated form the cylindrical mold, to give a polyimide resin belt.

The semiconductive member of the invention has been described, taking a polyimide resin belt as an example, however the invention is not restricted by these aspects, and various improvement, modification, and correction are possible by those who are skilled in the art within the scope of the invention.

<Image-Forming Apparatus>

The image-forming apparatus of the invention is not particularly limited in configuration, if it has a belt and a semiconductive member described above of the invention. Specifically, it may be, for example, a monochromic electrophotographic system having a single color (normally black) unit in the apparatus, a color electrophotographic system repeating primary transfer of toner images formed on a photosensitive body onto an intermediate transfer belt one by one, or a tandem color electrophotographic system containing multiple latent image-holding members respectively having developing devices in various colors aligned in series along an intermediate transfer belt. Alternatively, it may be an intermediate transfer system having an intermediate transfer belt or an image-forming apparatus having a mechanism of heating the belt directly or indirectly.

In these image-forming apparatuses, the polyimide resin belt may be used as an intermediate transfer belt or alternatively as a conveyor belt or a fixing belt. The intermediate transfer and fixing belt is a belt allowing processing in the intermediate transfer and fixing processes on the same belt.

As described above, the polyimide resin belt, a polyimide resin molded article of the invention, is uniform in resistance and superior in mechanical properties and surface smoothness, and thus, it is possible to obtain a high-quality transfer image reliably by using it in an image-forming apparatus.

Figure 1:
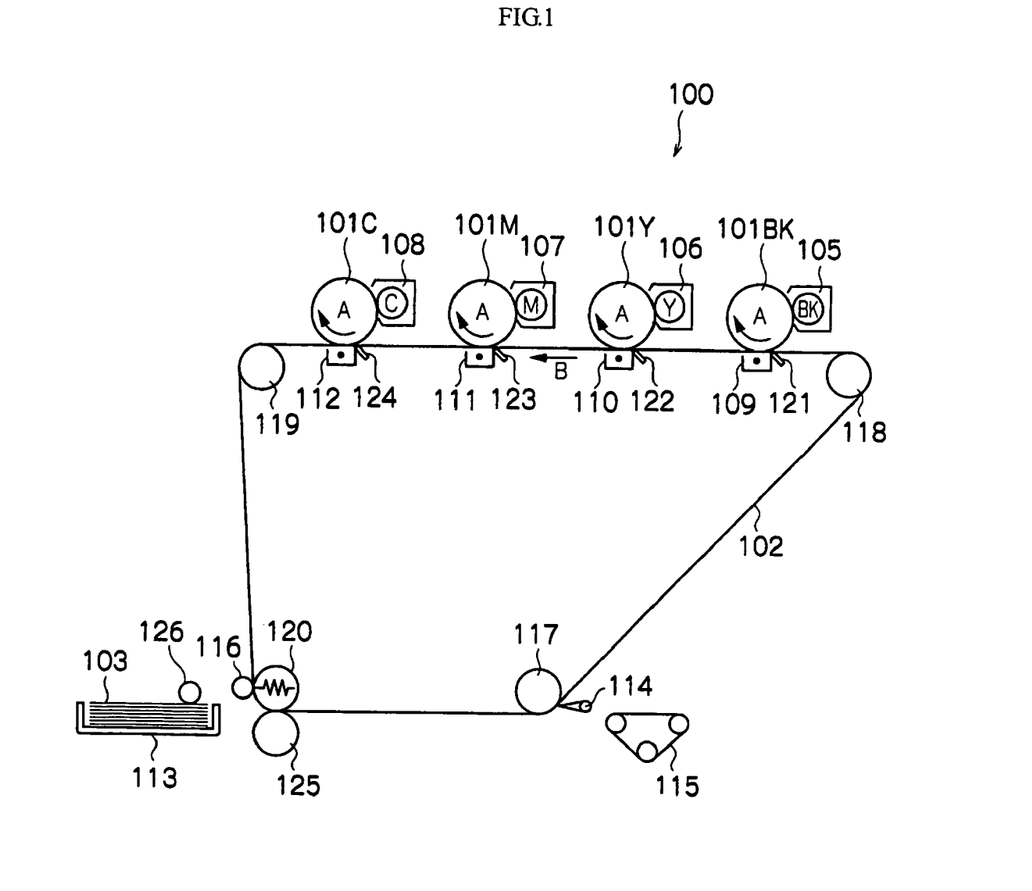
FIG. 1 is a schematic view illustrating the configuration of an image-forming apparatus of the invention.

Hereinafter, an example of the image-forming apparatus of the invention having the polyimide resin belt, a semiconductive member of the invention, will be described in detail with reference to drawings.

FIG. 1 is a schematic view illustrating the configuration of a color electrophotographic copying machine 100, an image-forming apparatus of the invention, employing a polyimide resin belt described above as its intermediate transfer belt.

100 represents a color electrophotographic copying machine (image-forming apparatus);
101 BK to Y, photosensitive body drums;
102, an intermediate transfer belt (polyimide-resin molded article);
103, a recording medium;
105 to 108, developing devices;
109 to 112, corona dischargers;
113, a recording medium container;
114, a releasing blade;
115, a conveyor belt;
116, a cleaning device;
117 to 119, belt supporting rolls;
120, a thermal transfer roll;
121 to 124, barrier walls;
125, a pressure roll; and
126, a paper-supplying roll.

In FIG. 1, 101BK, 101Y, 101M, and 101C each represent a photosensitive body drum (image carrier), on the surface of which an electrostatic latent image is formed according to image information by a known electrophotographic process (not shown in the Figure) by revolution in the direction indicated by the arrow A.

Developing devices 105 to 108 in various colors respectively of black (BK), yellow (Y), magenta (M) and cyan (C) are placed on the periphery of the photosensitive body drum 101BK, 101Y, 101M, 101C, and electrostatic latent images formed on the photosensitive body drum 101BK, 101Y, 101M, and 101C are respectively developed by the developing devices 105 to 108, into toner images. Thus, for example, an electrostatic latent image corresponding to yellow image information is formed on the photosensitive body drum 101Y; the electrostatic latent image is developed by a developing device 106 containing a yellow (Y) toner; and a yellow toner image is formed on the photosensitive body drum 101Y.

102 represents an intermediate transfer belt pressed into contact with the surface of the photosensitive body drums 101BK, 101Y, 101M, and 101C, which is conveyed in the direction indicated by the arrow B, as supported and stretched by multiple belt supporting rolls 117 to 119 and a thermal transfer roll 120.

The unfixed toner images formed on the photosensitive body drums 101BK, 101Y, 101M, and 101C are transferred one by one from the photosensitive body drums 101BK, 101Y, 101M, and 101C onto the surface of the intermediate transfer belt 102, at the primary transfer positions where the photosensitive body drums 101BK, 101Y, 101M, and 101C and the intermediate transfer body 102 are in contact with each other, and the images in various colors are superimposed there.

An antistatic corona discharger 109 to 112, of which electrification of the pressurization region is protected with a barrier wall 121 to 124, is placed at each primary transfer position on the rear face side of the intermediate transfer belt 102, and the unfixed toner image on each photosensitive body drum 101BK, 101Y, 101M, or 101C is attracted to the intermediate transfer belt 102 electrostatically by application of a voltage having a polarity reverse to that of the toner to the corona discharger 109 to 112. The primary transfer unit may not be a corona discharger if it uses electrostatic force, and thus, a conductive roll or brush under applied voltage may also be used. The electrostatic force is used, because use of the toner adhesive power by heat and pressure in primary transfer may result in easier damaging of the photosensitive body.

The unfixed toner image primary-transferred onto the intermediate transfer belt 102 is conveyed to the secondary transfer position facing the conveyance route of a recording medium 103 by conveyance of the intermediate transfer belt 102. At the secondary transfer position, a thermal transfer roll 120 containing a heat source such as ceramic heater or halogen lamp is placed in contact with the rear face of the intermediate transfer belt 102. In addition, a pressure roll 125 is placed at the secondary transfer position facing the thermal transfer roll 120. The pressure roll 125 preferably has a surface applied with a fluoroplastic resin, and contains a heat source, similarly to the thermal transfer roll 120.

A recording medium 103 fed from the recording medium container 113 by a paper-supplying roll 126 at a particular timing into the slit between the pressure roll 125 and intermediate transfer belt 102. Then, a voltage may be applied between the thermal transfer roll 120 and pressure roll 125. The unfixed toner image held on the intermediate transfer belt 102 is secondary-transferred onto the recording medium 103 under heat at the secondary transfer position.

The recording medium 103 carrying the transferred unfixed toner image is separated from the intermediate transfer belt 102 by a releasing blade 114 and fed into a fixing unit (not shown in the Figure) by a conveyor belt 115, where the unfixed toner image is fixed. Then, the image may be fixed by the secondary transfer device (by thermal transfer roll 120 and pressure roll 125), however it is preferable to have an independent fixing step as described above for obtaining sufficient color-fixing efficiency.

The pressure roll 125, the releasing blade 114 and the cleaning device 116 are removably arranged to the intermediate transfer belt 102, and these parts are separated from the intermediate transfer belt 102 until the secondary transfer.

EXAMPLES

Hereinafter, the invention will be described specifically with reference to Examples, however these Examples are aimed only for exemplification, and it should be understood that the scope of the invention is not restricted thereby. The "part" and "%" in the following Examples mean "parts by weight" and "% by weight" respectively, unless otherwise specified.

<Preparation of Polyamic Acid Composition>

(Polyamic Acid Composition C-1)

—Preparation of Polyamic Acid Solution—

Nitrogen gas dried with phosphorus pentoxide was supplied into a flask equipped with a stirring rod, a thermometer, and a dropping funnel, and 29.42 parts of 3,3',4,4'-biphenyltetracarboxylic dianhydride and 117.68 parts of N-methyl-2-pyrrolidone (NMP) were injected into the flask. After sufficient solubilization by stirring, a solution of 20.02 parts of 4,4'-diaminodiphenylether dissolved in 80.08 parts of N-methyl-2-pyrrolidone was added gradually, dropwise into the flask kept at 10° C. After dropwise addition of the diamine solution, the mixture was stirred for polymerization at 10 to 15° C. The reaction solution was poured into a great amount of methanol for reprecipitation and purification. The precipitated white polymer was filtered and dried, and then, redissolved in N-methyl-2-pyrrolidone, to give polyamic acid solution at a concentration of 20%.

—Preparation of Polyaniline Particle Dispersion (1) (Polyaniline Particle (A)-Containing Dispersion)—

3,000 parts of zirconium beads having a diameter of 1 mm, 1,100 parts of the polyamic acid solution, and 31 parts of polyaniline particles in a particular shape 1 (fibrous region length: 5 μm, aspect ratio: 3, maximum length: 6 μm), and 30 parts of a dopant phenolsulfonic acid were placed and processed in a sand mill dispersing machine at 2,000 rpm for 1 hour, to give a polyaniline particle dispersion (1) containing charged polyaniline particles in a particular shape (A).

—Preparation of Polyaniline Particle Dispersion (2) (Polyaniline Particle (B)-Containing Dispersion)—

30 parts of polyaniline particles 2 was dissolved in 1,100 parts of the polyamic acid solution containing N-methylpyrrolidone (NMP) as its solvent, and 25 parts of dodecylbenzenesulfonic acid was added thereto, to give a polyaniline particle dispersion (2) containing the polyaniline particles (B). The polyaniline particles 2 precipitated as fine particles are spherical in shape, and the maximum diameter was 0.01 μm.

—Mixing of Polyaniline Dispersion—

Polyaniline particle dispersions (1) and (2) obtained by the method above were mixed at a weight ratio of 5/5, to give a polyamic acid composition C-1.

(Polyamic Acid Compositions C-2 to C-4)

Polyamic acid compositions C-2 to C-4 were prepared in a similar manner to the polyamic acid composition C-1, except that the blending ratio of the polyaniline particle dispersions (1) and (2) used in preparation of the polyamic acid composition C-1 was changed to that shown in Table 1.

(Polyamic Acid Composition C-5)

A polyamic acid composition C-5 was prepared in a similar manner to polyamic acid composition C-1, except that the polyaniline particles 1 containing an fibrous-region having an aspect ratio of 3 used in preparation of the polyaniline particle dispersion (1) for polyamic acid composition C-1 was replaced with 31 parts of polyaniline particles in a particular shape 3 (fibrous region length: 1.25 μm, maximum length: 1.5 μm) containing a fibrous region having an aspect ratio of 2.5.

(Polyamic acid composition C-6)

A polyamic acid composition C-6 was prepared in a similar manner to polyamic acid composition C-1, except that the polyaniline particles 1 containing a fibrous region having an aspect ratio of 3 used in preparation of the polyaniline particle dispersion (1) for polyamic acid composition C-1 was replaced with polyaniline particles in a particular shape 4 containing a fibrous region having an aspect ratio of 70 (fibrous region length: 35 μm, maximum length: 40 μm).

(Polyamic Acid Composition CR-1)

The polyaniline particle dispersion (2) used in preparing the polyamic acid composition C-1 was used alone, as a polyamic acid composition CR-1.

(Polyamic Acid Composition CR-2)

A polyaniline particle dispersion was prepared in a manner similar to the polyaniline particle dispersion (2), except that the polyaniline particles 2 used in preparation of the polyaniline particle dispersion (2) used for the polyamic acid composition C-1 were replaced with polyaniline particles 5 (spherical shape, maximum diameter: 0.0008 μm), and a polyamic acid composition CR-2 was prepared by using the dispersion alone.

(Polyamic Acid Composition CR-3)

A polyaniline particle dispersion was prepared in a manner similar to the polyaniline particle dispersion (2), except that the polyaniline particles 2 used in preparation of the polyaniline particle dispersion (2) used for the polyamic acid composition C-1 were replaced with polyaniline particles 6 (spherical shape, maximum diameter: 0.5 μm), and a polyamic acid composition CR-3 was prepared by using the dispersion alone.

<Properties of Polyamic Acid Composition>

The dispersion efficiency of each of the polyamic acid compositions obtained was examined by visual observation, and the viscosities thereof (V0 and V2) were determined by using a sample immediately after preparation and also a sample after storage for two days (room temperature storage), and the viscosity change rate (V2/V0 was determined.

The polyamic acid composition was adjusted to a liquid temperature 25° C. before measurement of viscosity by using a constant-speed viscometer PK100 manufactured by HAKKE. Results are summarized in Table 1.

TABLE 1

|  |  | C-1 | C-2 | C-3 | C-4 | C-5 | C-6 | CR-1 | CR-2 | CR-3 |
|---|---|---|---|---|---|---|---|---|---|---|
| Mixture | Dispersion 1/dispersion 2 | 5/5 | 3/7 | 7/3 | 10/0 | 5/5 | 5/5 | 0/10 | 0/10 | 0/10 |
|  | Particles | 0.122 | 0.120 | 0.122 | 0.141 | 0.122 | 0.122 | — | — | — |

TABLE 1-continued

|  |  | C-1 | C-2 | C-3 | C-4 | C-5 | C-6 | CR-1 | CR-2 | CR-3 |
|---|---|---|---|---|---|---|---|---|---|---|
|  | (A) + (B)/particles |  |  |  |  |  |  |  |  |  |
|  | (A) + (B) + polyamic acid |  |  |  |  |  |  |  |  |  |
| Polyaniline particle (A) | Fiber length (μm) | 5 | 5 | 5 | 5 | 1.25 | 35 | — | — | — |
|  | Aspect ratio | 3 | 3 | 3 | 3 | 2.5 | 70 | — | — | — |
|  | Maximum length (μm) | 7 | 7 | 7 | 7 | 1.5 | 40 | — | — | — |
|  | Content (% by weight) | 6.1 | 3.0 | 6.8 | 14.1 | 6.1 | 6.1 | 0 | 0 | 0 |
| Viscosity change (V2/V0) |  | 0.95 | 0.98 | 0.93 | 0.93 | 0.94 | 0.97 | 0.60 | 0.85 | 0.86 |

Example 1

(Preparation of Polyimide Resin Belt)

The polyamic acid composition C-1 was applied on the surface of a SUS cylindrical mold having an internal diameter of 90 mm and a length of 450 mm. A fluorine-based releasing agent was previously applied on the surface of the cylindrical mold for improvement of the separability of the belt after molding. Then, the coated film was dried under the condition of 120° C. for 30 minutes, while the cylindrical mold was rotated. After drying, the cylindrical mold was placed and baked in an oven at 280° C. for 30 minutes, allowing progress of imidation reaction. Subsequently, the cylindrical mold was gradually cooled at room temperature, and the resin was separated from the mold, to give a desirable polyimide resin belt (semiconductive member). The polyimide resin belt thus obtained had a thickness of 80 μm, a peripheral length of 283 mm, and a width of 400 mm.

(Evaluation of the Properties of Polyimide Resin Belt)

In addition to the variation in film thickness, the electrical characteristics (surface resistivity and its fluctuation, fluctuation by environmental variation), and the surface smoothness of the polyimide resin belt obtained were evaluated in the following manners.

—Fluctuation in Film Thickness—

Ten test pieces of 20 mm×200 mm in size were cut off randomly at ten portions from the polyimide resin belt obtained, and the thickness of each test piece was determined by using a constant pressure thickness analyzer (PG-02, manufactured by TECLOCK).

The difference between the maximum and minimum values of the measured film thicknesses was designated as the fluctuation in film thickness.

—Measurement of Surface Resistivity—

The surface resistivity of the polyimide resin belt obtained was determined by using R8340 A digital ultrahigh-resistance/minute-current ammeter (manufactured by Advantest Corporation), UR Probe MCP-HTP12 in the double-ring electrode structure with its joint reformed to that for R8340A, and Regitable UFL MCP-ST03 (all, manufactured by Dia Instruments Co., Ltd.). The test piece used for measurement was a belt sample of 5 cm×5 cm in size cut off from the polyimide resin belt prepared.

First, a test piece was placed on the Regitable UFL MCPTST03 (fluoroplastic resin face) with its measuring face facing upward, and the double electrodes of UR Probe MCP-HTP12 was mounted on the measuring face. A weight of 19.6N±1N was placed atop the UR Probe MCP-HTP12, applying the load over the entire test piece.

Measurement with the R8340 A digital ultrahigh-resistance/minute-current ammeter was performed at a discharge time of 30 seconds, a discharge time of 1 second, and an applied voltage of 100 V. When the surface resistivity of test piece is designated as ρs; the reading by the R8340A digital ultrahigh-resistance/minute-current ammeter as R; the surface-resistivity correction coefficient for the UR Probe MCP-HTP12, as RCF(S), because the RCF(S) is 10.00 according to the catalog for the "Resistance Meter series products" of Mitsubishi Chemical Corp., the surface resistivity ρs is calculated according to the following Formula (2):

$$\rho s[\Omega/\text{square}] = R \times RCF(S) = R \times 10 \qquad \text{Formula (2)}$$

The fluctuation in surface resistivity (Δρs) was determined by selecting 24 points on the surface of the prepared polyimide resin belt: 8 positions in the length direction (peripheral direction) and three positions in the width direction, determining the common logarithm of surface resistivity at each point, and calculating the difference between the maximum and minimum values. The fluctuation in surface resistivity by environmental variation was determined by leaving each belt piece under an environment of 10° C. and 15% RH and under an environment of 28° C. and 85% RH for eight hours, measuring the surface resistivity under each environment by the method above, and determining the difference.

—Surface Smoothness—

Three areas of 25 cm×20 cm (500 cm²) are selected randomly on the polyimide resin belt obtained; the number of projections having a width of 25 μm or more present specifically in each area was determined; and the average of the projection numbers was used as the indicator of the surface smoothness. The results are summarized in Table 1.

(Evaluation of Performance in Actual Machine)

The polyimide resin belt obtained was placed in an electrophotographic apparatus DocuCentreColor400CP (manufactured by Fuji Xerox Co., Ltd.) as its intermediate transfer belt, and the quality of the initial transfer image was evaluated. As the evaluation items, the quality of transferred image, presence of printing unevenness and white spots was examined.

—Printing Unevenness—

A low-density (40%) monochrome magenta image was printed on A3 paper, and the printing unevenness, i.e., unevenness in density in the image, was evaluated according to the following criteria:

A: No unevenness

B: Slight unevenness, but practically without problem

C: Unevenness with practical problem in quality

—White Spots—

The external surface of the belt was observed with a three-dimensional roughness meter, and a low-density (40%) monochrome magenta image was printed on A3 paper, and presence of white spots in the image was determined according to the following standard criteria:
A: No problem in image quality.
B: Some projections of 10 to 20 μm present but without problem in image quality.
C: Many projection of 20 μm or more present with problem in image quality.
The results are summarized in Table 2.

Examples 2 to 6 and Comparative Examples 1 to 3

Tests were performed in a similar manner to Example 1, except that the polyamic acid composition C-1 used in Example 1 was replaced with the polyamic acid composition shown in Table 1. Results are summarized in Table 2.

<5> A polyimide resin, comprising polyaniline particles including a fibrous region having an aspect ratio of between approximately 1 to approximately 100.

<6> The polyimide resin of <5>, wherein the aspect ratio is in the range of approximately 3 to approximately 50.

<7> The polyimide resin of <5>, wherein the maximum length of the polyaniline particles is in the range of approximately 0.5 to approximately 50 μm.

<8> The polyimide resin of <5>, wherein the amount of the polyaniline particles is in the range of approximately 1% to approximately 15% by weight thereof.

<9> The polyimide resin of <5>, wherein the difference between a common logarithm of the surface resistance $R_L$ in an environment of 10° C. and 15% RH and a common loga-

TABLE 2

| | | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| Polyamic acid composition | | C-1 | C-2 | C-3 | C-4 | C-5 | C-6 | CR-1 | CR-2 | CR-3 |
| Electrical characteristics | Surface resistivity (log Ω/square) | 11.8 | 11.6 | 11.9 | 11.4 | 11.9 | 11.2 | 11.8 | 13.2 | 13.6 |
| | Fluctuation in resistance (log Ω/square) | 0.7 | 0.5 | 0.5 | 0.4 | 0.6 | 0.6 | 1.5 | 1.1 | 1.4 |
| | Environmental fluctuation in resistance (log Ω/square) | 0.75 | 0.73 | 0.82 | 0.75 | 0.81 | 0.80 | 0.90 | 0.88 | 0.85 |
| Fluctuation in film thickness (μm) | | 10 | 6 | 8 | 8 | 7 | 7 | 30 | 11 | 18 |
| Surface smoothness (projections) | | 3 | 13 | 9 | 8 | 11 | 18 | 35 | 15 | 16 |
| Actual-machine evaluation (initial) | Unevenness in density | A | A | A | A | A | A | B | A | A |
| | White spots | A | A | A | A | A | A | C | B | C |
| Actual-machine evaluation (50,000 sheets) | Unevenness in density | A | A | A | A | A | A | B | A | B |
| | White spots | A | A | A | A | B | B | C | B | C |

As apparent form the results above, the polyimide resin belts obtained by using the polyamic acid compositions of Examples were superior in belt appearance and surface smoothness and also smaller in fluctuation of belt thickness. The belts were also favorable in mechanical strength and electrical characteristics, and thus had properties favorable for use as an intermediate transfer belt.

On the other hand, the polyimide resin belts obtained by using the polyamic acid compositions of Comparative Example were larger in fluctuation of thickness and surface resistance, because the polyamic acid compositions were not stabilized in viscosity and could not be applied evenly, and thus, such a belt gave a low-quality image when used in an electrophotographic system.

According to exemplary embodiments of the invention, there are provided:

<1> A polyamic acid composition, comprising: a polyamic acid; polyaniline particles, including a fibrous region having an aspect ratio of between approximately 1 to approximately 100; a dopant; and a solvent.

<2> The polyamic acid composition of <1>, wherein the aspect ratio is in the range of approximately 3 to approximately 50.

<3> The polyamic acid composition of <1>, wherein the maximum length of the polyaniline particles is in the range of approximately 0.5 to approximately 50 μm.

<4> The polyamic acid composition of <1>, wherein the amount of the polyaniline particles is in the range of approximately 1% to approximately 15% by weight thereof.

rithm of the surface resistance $R_H$ in an environment of 28° C. and 85% RH (log $R_L$ – log $R_H$) is in the range of approximately 0.01 to approximately 1.0 log Ω/square.

<10> The polyimide resin of <7> wherein the difference between a common logarithm of the surface resistance $R_L$ in an environment of 10° C. and 15% RH and a common logarithm of the surface resistance $R_H$ in an environment of 28° C. and 85% RH (log $R_L$ – log $R_H$) is in the range of approximately 0.01 to approximately 1.0 log Ω/square.

<11> A semiconductive member, comprising a polyimide resin including polyaniline particles including a fibrous region having an aspect ratio of between approximately 1 to approximately 100.

<12> The semiconductive member of <11>, wherein the aspect ratio is in the range of approximately 3 to approximately 50.

<13> The semiconductive member of <11>, wherein the maximum length of the polyaniline particle is in the range of approximately 0.5 to approximately 50 μm.

<14> The semiconductive member of <11>, wherein the amount of the polyaniline particles is in the range of approximately 1% to approximately 15% by weight thereof.

<15> The semiconductive member of <11>, wherein the semiconductive member is substantially in a belt shape.

<16> An image-forming apparatus, comprising the substantially belt-shaped semiconductive member of <15>.

<17> A method of producing a polyamic acid composition, the method comprising:

preparing a first dispersion liquid containing conductive polyaniline particles including a fibrous region having an aspect ratio of between approximately 1 to approximately 100 dispersed in a liquid containing polyamic acid;

preparing a second dispersion liquid by dispersing non-conductive polyaniline particles and a dopant in a liquid containing polyamic acid; and mixing together the first and the second dispersions.

<18> The method of producing a polyamic acid composition of <17>, wherein the aspect ratio is in the range of approximately 3 to approximately 50.

<19> The method of producing a polyamic acid composition of <17>, wherein the maximum length of the polyaniline particles is in the range of approximately 0.5 to approximately 50 μm.

<20> The method of producing a polyamic acid composition of <17>, wherein the amount of the polyaniline particles is in the range of approximately 1% to approximately 15% by weight thereof.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in the order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method of producing a polyamic acid composition, the method comprising:

preparing a first dispersion liquid containing conductive polyaniline particles including a fibrous region having an aspect ratio of between approximately 1 to approximately 100 dispersed in a liquid containing polyamic acid;

preparing a second dispersion liquid by dispersing non-conductive polyaniline particles and a dopant in a liquid containing polyamic acid; and mixing together the first and the second dispersions.

2. The method of producing a polyamic acid composition of claim 1, wherein the aspect ratio is in the range of approximately 3 to approximately 50.

3. The method of producing a polyamic acid composition of claim 1, wherein the maximum length of the polyaniline particles is in the range of approximately 0.5 to approximately 50 μm.

4. The method of producing a polyamic acid composition of claim 1, wherein the amount of the polyaniline particles is in the range of approximately 1% to approximately 15% by weight thereof.

* * * * *